United States Patent
Santos et al.

(10) Patent No.: US 10,936,945 B2
(45) Date of Patent: Mar. 2, 2021

(54) QUERY CLASSIFICATION FOR APPROPRIATENESS

(71) Applicant: Microsoft Technology Licensing, LLC, Redmond, WA (US)

(72) Inventors: Jose Carlos Almeida Santos, London (GB); Paul David Arnold, Bracknell (GB); Ward Farquhar Roper, Surbiton (GB); Parth Gupta, Gandhinagar (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 1290 days.

(21) Appl. No.: 15/174,188

(22) Filed: Jun. 6, 2016

(65) Prior Publication Data

US 2017/0351951 A1 Dec. 7, 2017

(51) Int. Cl.
*G06N 3/08* (2006.01)
*G06F 16/28* (2019.01)
(Continued)

(52) U.S. Cl.
CPC ............ *G06N 3/08* (2013.01); *G06F 16/285* (2019.01); *G06F 16/90324* (2019.01); *G06F 16/9535* (2019.01)

(58) Field of Classification Search
CPC ..... G06N 3/08; G06F 16/285; G06F 16/9535; G06F 16/90324
See application file for complete search history.

(56) References Cited

U.S. PATENT DOCUMENTS 7,680,778 B2 3/2010 Middha et al.
8,027,964 B2 9/2011 Boulis
(Continued)

FOREIGN PATENT DOCUMENTS

WO 2016082877 6/2016

OTHER PUBLICATIONS

Shen, Yelong, et al. "A latent semantic model with convolutional-pooling structure for information retrieval." Proceedings of the 23rd ACM international conference on conference on information and knowledge management. 2014. (Year: 2014).*
(Continued)

*Primary Examiner* — Benjamin P Geib (57) ABSTRACT

Non-limiting examples of the present disclosure describe query classification to identify appropriateness of a query. A query may be received by at least one processing device. A deep neural network (DNN) model may be applied to evaluate the query. A vector representation may be generated for query based on application of the DNN model, where the DNN model is trained to classify queries according to a plurality of categories of appropriateness. The DNN model may be utilized to classify the query in a category of appropriateness based on analysis of the vector representation. In one example, auto-complete suggestions for the query may be filtered based on the classification of the category of appropriateness. In another example, classification of the query may be provided to an entry point. In yet another example, a response to the query is managed based on the classification of the query. Other examples are also described.

20 Claims, 7 Drawing Sheets

(51) Int. Cl.
  *G06F 16/9535* (2019.01)
  *G06F 16/9032* (2019.01)

(56) References Cited

U.S. PATENT DOCUMENTS

| | | | |
|---|---|---|---|
| 8,176,069 | B2 | 5/2012 | Timm et al. |
| 8,577,913 | B1 | 11/2013 | Hansson et al. |
| 8,983,995 | B2 | 3/2015 | Hsu et al. |
| 9,031,970 | B1 | 5/2015 | Das et al. |
| 10,169,488 | B2 * | 1/2019 | Long ............ G06F 16/90324 |
| 2009/0043741 | A1 | 2/2009 | Kim |
| 2009/0276417 | A1 | 11/2009 | Shapira et al. |
| 2014/0379689 | A1 | 12/2014 | Huffman et al. |
| 2015/0325237 | A1 | 11/2015 | Chang et al. |
| 2016/0246791 | A1 * | 8/2016 | Long ............ G06F 16/9535 |

OTHER PUBLICATIONS

Shen, Yelong, et al. "Learning semantic representations using convolutional neural networks for web search." Proceedings of the 23rd International Conference on World Wide Web. 2014. (Year: 2014).*

Kharitonov, et al., "Intent Models for Contextualising and Diversifying Query Suggestions", In Proceedings of 22nd ACM International Conference on Information and Knowledge Management, Oct. 27, 2013, 8 pages.

Via, et al., "Learning Latent Semantic Relations from Clickthrough Data for Query Suggestion", In Proceedings of 17th ACM Conference on Information and Knowledge Management, Oct. 26, 2008, pp. 709-718.

Momtazi, et al., "Generating query suggestions by exploiting latent semantics in query logs", In Journal of Information Science, Jul. 21, 2015, 1 page.

Zhang, et al., "Improved Query Suggestion by Query Search", In Proceedings of 35th Annual German Conference on AI, Sep. 24, 2012, 12 pages.

Hawari, et al., "Predicting latent attributes by extracting lexical and sociolinguistics features from user tweets", In Proceedings of International Conference on Data and Software Engineering, Nov. 26, 2014, 5 pages.

Bar-Yossef, et al., "Context-Sensitive Query Auto-Completion", In Proceedings of the 20th international conference on World Wide Web, Mar. 28, 2011, 10 pages.

Gianfortoni, et al., "Modeling of stylistic variation in social media with stretchy patterns", In Proceedings of the First Workshop on Algorithms and Resources for Modelling of Dialects and Language Varieties, Jul. 31, 2011, 11 pages.

Ho, Tin Kam, "The Random Subspace Method for Constructing Decision Forests", In Journal of IEEE Transactions on Pattern Analysis and Machine Intelligence, vol. 20, Issue 8, Aug. 1998, pp. 832-844.

Huang, et al., "Learning Deep Structured Semantic Models for Web Search Using Clickthrough Data", In Proceedings of the 22nd ACM international conference on Information & Knowledge Management, Oct. 27, 2013, 8 pages.

Mahmud, et al., "Detecting Flames and Insults in Text", In Proceedings of the Sixth International Conference on Natural Language Processing, Dec. 20, 2008, 10 pages.

Razavi, et al., "Offensive Language Detection Using Multi-level Classification", In Proceedings of the 23rd Canadian conference on Advances in Artificial Intelligence, May 31, 2010, 12 pages.

Spertus, Ellen, "Smokey: Automatic Recognition of Hostile Messages", in Proceedings of the fourteenth national conference on artificial intelligence and ninth conference on Innovative applications of artificial intelligence, Jul. 27, 1997, 8 pages.

Xiang, et al., "Detecting offensive tweets via topical feature discovery over a large scale twitter corpus", In Proceedings of the 21st ACM international conference on Information and knowledge management, Oct. 29, 2012, 5 pages.

PCT International Search Report and Written Opinion in PCT/US2017/034102, dated Jul. 24, 2017, 12 pages.

* cited by examiner

QUERY CLASSIFICATION FOR APPROPRIATENESS

BACKGROUND

Every day billions of queries are issued in commercial search engines. These queries reflect users' needs, desires, behaviors, interests but also prejudices. Query auto-completion is a powerful feature and is nowadays omnipresent in many forms and entry points, e.g. search engines, social networks, web browsers and operating systems. Suggestions not only speed up the process of entering a query but also shape how users query and can make the difference between a successful search and a frustrated user. The main source of these query completions is past, aggregated, user queries. A non-negligible fraction of these queries contain offensive, adult, illegal or otherwise inappropriate content. Surfacing these completions can have legal implications, offend users and give the incorrect impression that companies providing the query completion service condone these views.

A typical method to deal with detecting inappropriate queries is to filter queries using blocklists. A blocklist based approach uses a set of substring and pattern-matching techniques to identify inappropriate queries. Blocklists contain strings that can never appear in a query, e.g. swear words. Pattern match blocklists assume various forms. One is the <entity><qualifier> pattern where a list of entities e.g. person names, ethnic/religious/political groups with common associated derogatory expressions. When a query contains both a known entity and a derogatory qualifier associated with that entity type, the query is identified as offensive. For instance, a suggestion of the form "X are Y" is blocked by a pattern match blocklist if $X \in \{jews, christians, muslims, blacks\}$ and $Y \in \{stupid, idiots, retarded\}$. A query in such a form is registered as offensive and processed accordingly. While blocklist techniques perform acceptably, there are several limitations: the combination is a semi-manual process requiring list curation and maintenance; all possible variations of an entity and derogatory terms must be provided, e.g. singular, plural, synonyms; blocklist techniques provide no generalization power beyond the contents of the lists; blocklists are rigid and do not account for grammar syntax errors; and blocklists may struggle with queries that are in a novel form (previously unseen).

Another typical method for detecting inappropriate queries is a support vector machine (SVM) model. An SVM model is supervised machine learning model with associated learning algorithms that analyze data for classification and regression analysis. In most cases, SVM models may perform worse than blocklists for appropriateness classification of a query because SVM models attempt to learn discriminative patterns automatically (where blocklists are highly curated).

Although blocklist and SVM models can achieve high precision, such solutions obtain relatively low recall for categorizing an appropriateness of a query. This is because blocklists and SVM models mechanically filter queries based on lexical features with an inability to generalize a query and consider different forms and features associated with the query. Further, blocklist and SVM approaches attempt to filter content in an unsupervised manner.

As such, it is with respect to the general technical environment of improved processing related to query classification that the present application is directed.

SUMMARY

Non-limiting examples of the present disclosure describe query classification to identify appropriateness of a query. A query may be received by at least one processing device. A deep neural network (DNN) model may be applied to evaluate the query. In one example, the DNN model is a deep structured semantic model (DSSM). A DNN or DSSM model may be trained to classify queries according to a plurality of categories of appropriateness. A vector representation may be generated for query based on application of the DNN model. The DNN model may be utilized to classify the query in a category of appropriateness based on analysis of the vector representation. In at least one example, auto-complete suggestions for the query may be filtered based on the classification of the category of appropriateness. In other examples, responses to the query may be managed based on classification of the category of appropriateness of the query.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Examples describe herein relate to query classification. In examples, a query may be classified according to a category of appropriateness in order to determine how to further process the query. Further processing of a query may comprise determining whether to provide an auto-complete suggestion for a query, among other examples. In one example, queries that are classified as inappropriate may be filtered from suggested/recommended content. For instance, auto-complete suggestions for a query may be filtered to avoid including inappropriate suggestions.

In another example, an application/service may classify a query in order to tailor a response to the query in an appropriate manner. For instance, consider an example where a chatbot application/service is to respond to a query. A chatbot is conversational component designed to simulate an intelligent conversation with one or more users via auditory or textual methods. Classification of the query is useful to assist the chatbot application/service in managing a conversation away from inappropriate content or responses. In some instances, classification of a query as inappropriate can assist a chatbot in providing response that identify the query as inappropriate or engaging a user in further dialog to understand an intent of such an inappropriate query. While an example of a chatbot application/service is provided, one skilled in the art should recognize that examples described herein extend to any type of application/service that processes queries.

In yet another example, a classification of appropriateness for a query may be passed to an entry point associated with providing results for a query. An entry point is a point of entry or platform for communication with an application or service for unified ranking processing. In examples, an entry point may include but is not limited to: any applications/services including search applications, intelligent personal assistant applications, first-party products/services, second-party products/services, and third-party products/services, among other examples. For instance, a classification of appropriateness may be signal data provided to a web ranking service that evaluates and returns content results for the query. A classification of appropriateness may improve processing efficiency during subsequent stages of query processing. In one instance, richer result content may be provided based on an initial classification of appropriateness of the query.

In further examples, query processing may be utilized to further train and update models associated with classification of a query. A model may be generated that is configured to represent queries in different clusters of appropriateness/inappropriateness. For instance, a query can be classified as appropriate or inappropriate. In some examples, classification may identify categories of offensiveness/inappropriateness such as: offensive/profane, sexual, pertaining to violence, illegality, self-harm or derogatory towards race/religion/gender, among other examples. While appropriateness of a query may be subjective, examples herein execute processing operations to evaluate lexical features of a query and classify the query into a classified classification/category of appropriateness. Previous query data may be processed and supervised through dimensionality reduction using a deep neural network (DNN) model. One skilled in the art should recognize that examples described herein may extend to adapt any type of DNN model for the classification of queries. In an example, a deep structured semantic model (DSSM) may be applied to evaluate latent lexical features of a received query. A DSSM is structurally a deep neural network which models the queries to represent the queries in a low-dimensional latent space. Evaluating data of a query in this manner enables any query (even a previously unseen/novel query) to be processed and classified. Additionally, examples described herein are tolerant of spelling or syntax errors in a query that may be overlooked by other solutions such as blocklists or SVMs. In some cases, a query may contain words which themselves are offensive but in the query context such words are not inappropriate. For instance, inclusion of a word such as "suicide" may be included in a query requesting a suicide helpline. DSSM clustering features of the present disclosure can help to identify such patterns and do so in a supervised manner. Processing operations described herein evaluate lexical features as well as cluster lexical features to further evaluate such lexical features in an abstract learning space associated with a DNN model. For instance, lexical features can be evaluated and labeled, where the DNN model may employ an objective function to cluster queries from known appropriateness categories. A classifier (e.g. ensemble classifier) can be developed to evaluate new queries for appropriateness and classify the queries according to categories of appropriateness.

While a DSSM may be applied to evaluate lexical features of a query, examples herein may further extend to include evaluation of more than just lexical features. For instance, device signal data, user profile data, prosodic features associated with an utterance, etc., may also be considered when evaluating a query. Further, DNN models may be adapted to handle queries in different languages or queries that combine languages.

Accordingly, the present disclosure provides a plurality of technical advantages including but not limited to: improved query processing including classification of appropriateness of a query, generation and management of a DNN model adapted to classify an appropriateness of a query and model queries in a low-dimensional latent space, higher recall in identifying patterns in queries including an ability to classify appropriateness of previously unforeseen queries, extensibility to incorporate query classification examples to a plurality of entry points, ability to improve user interaction with a processing device during query processing, and more efficient operation of a processing device (e.g., saving computing cycles/computing resources) when providing responses to queries, among other examples.

Figure 1:
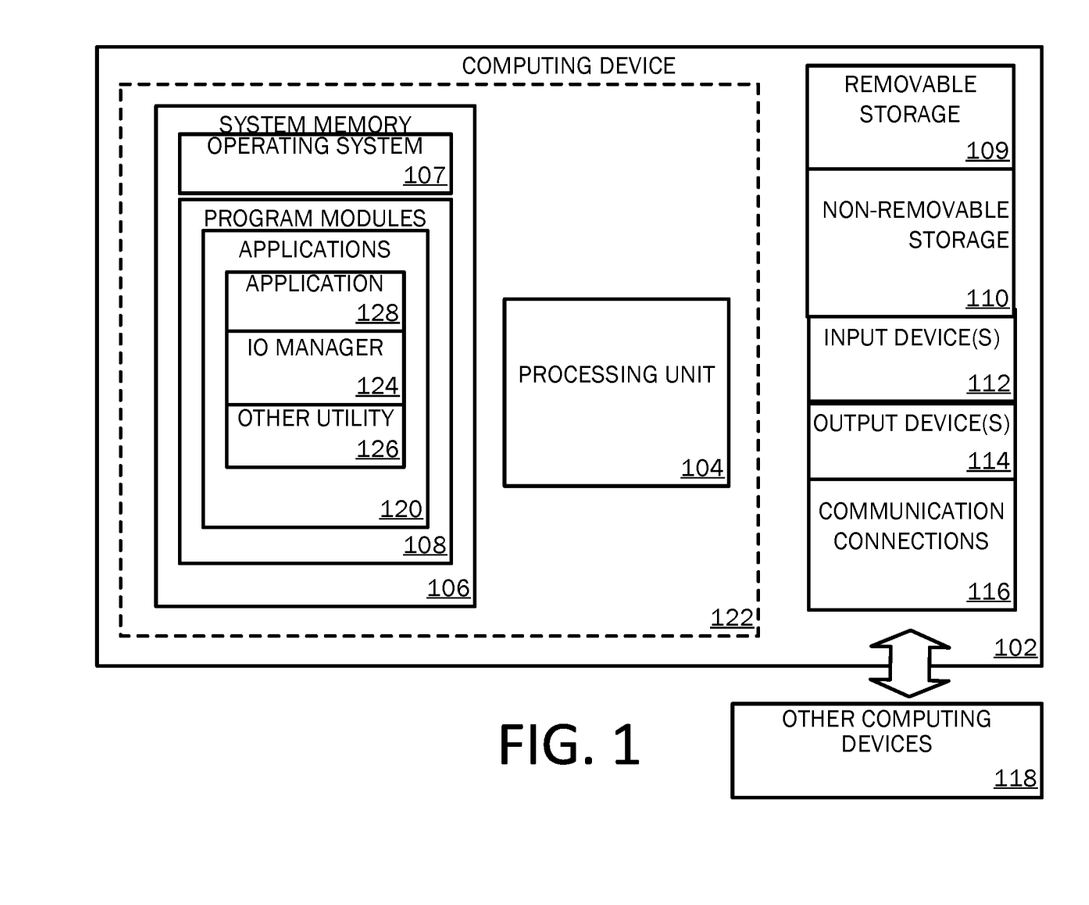
FIG. 1 is a block diagram illustrating an example of a computing device with which aspects of the present disclosure may be practiced.
Figure 2A:
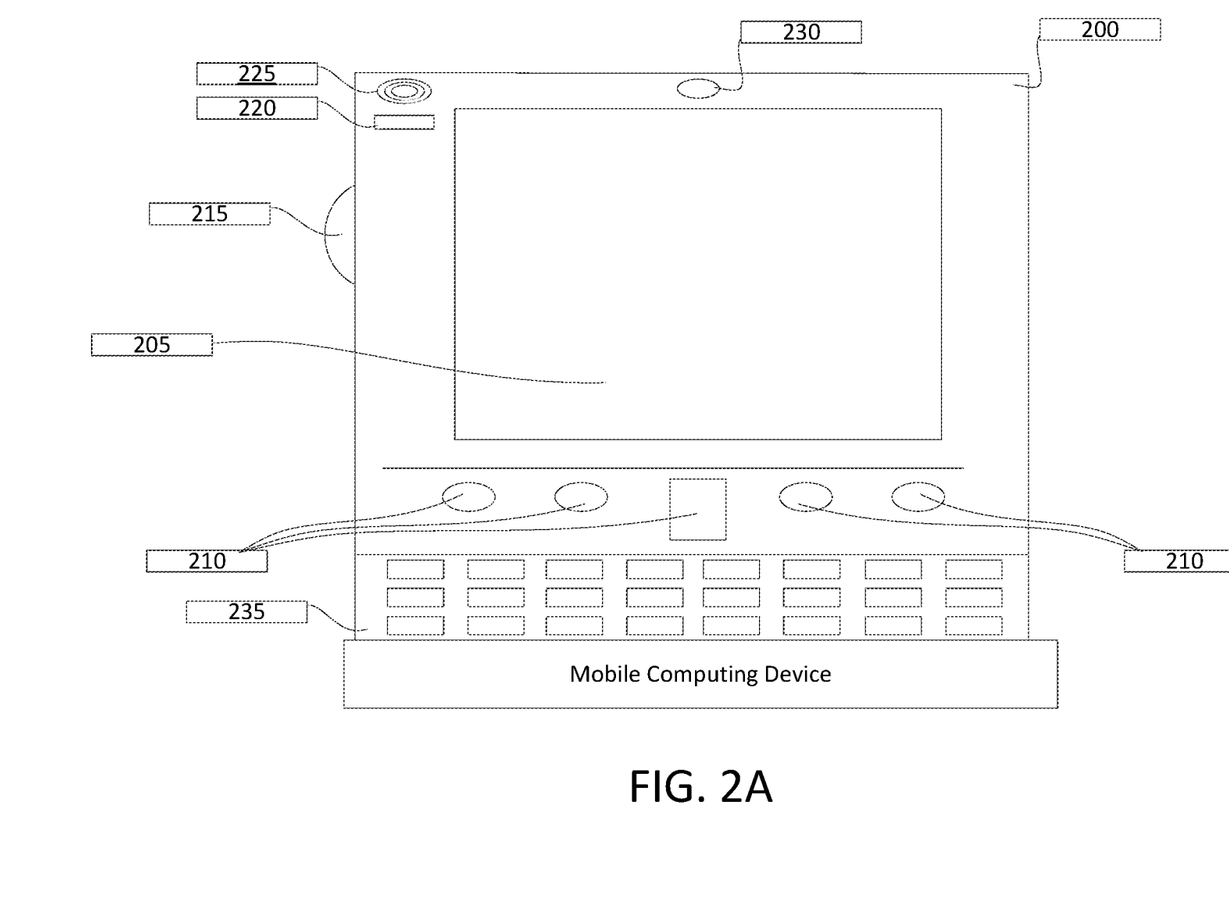
FIGS. 2A and 2B are simplified block diagrams of a mobile computing device with which aspects of the present disclosure may be practiced.
Figure 2B:
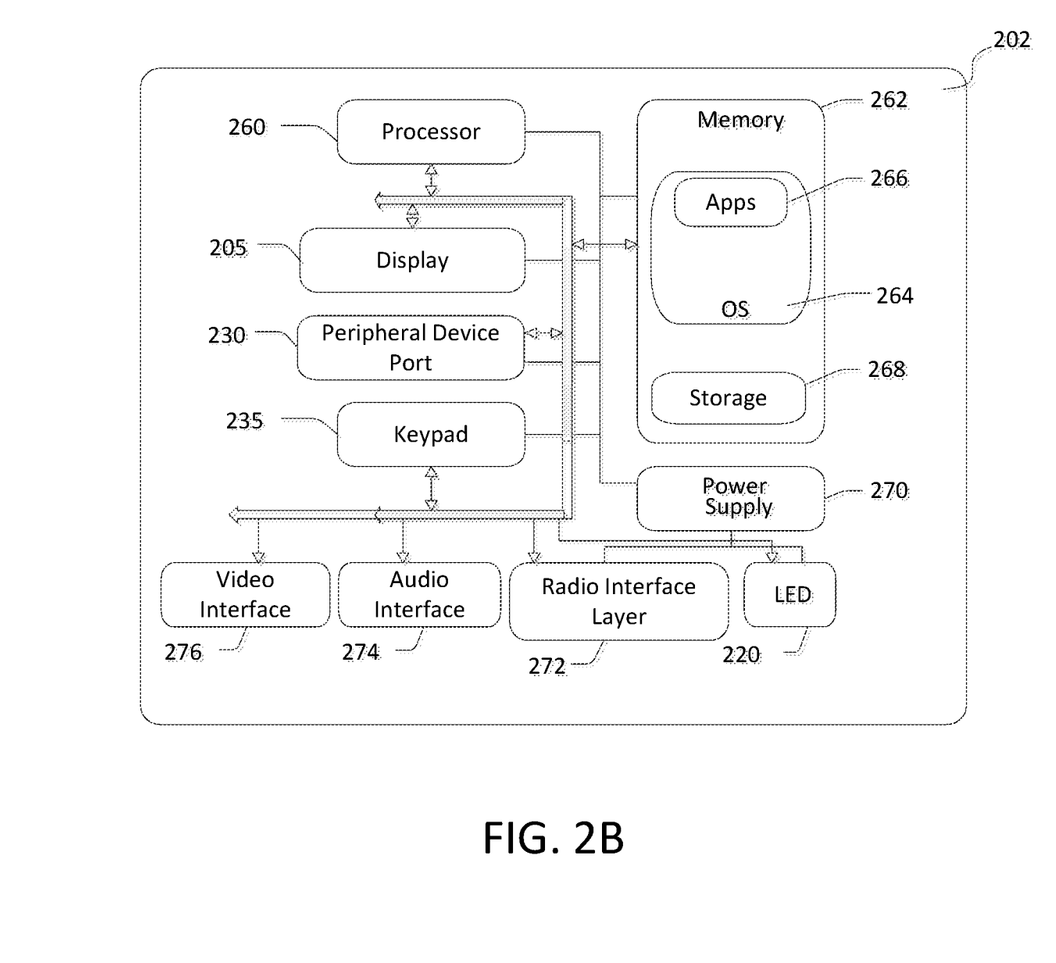
Figure 3:
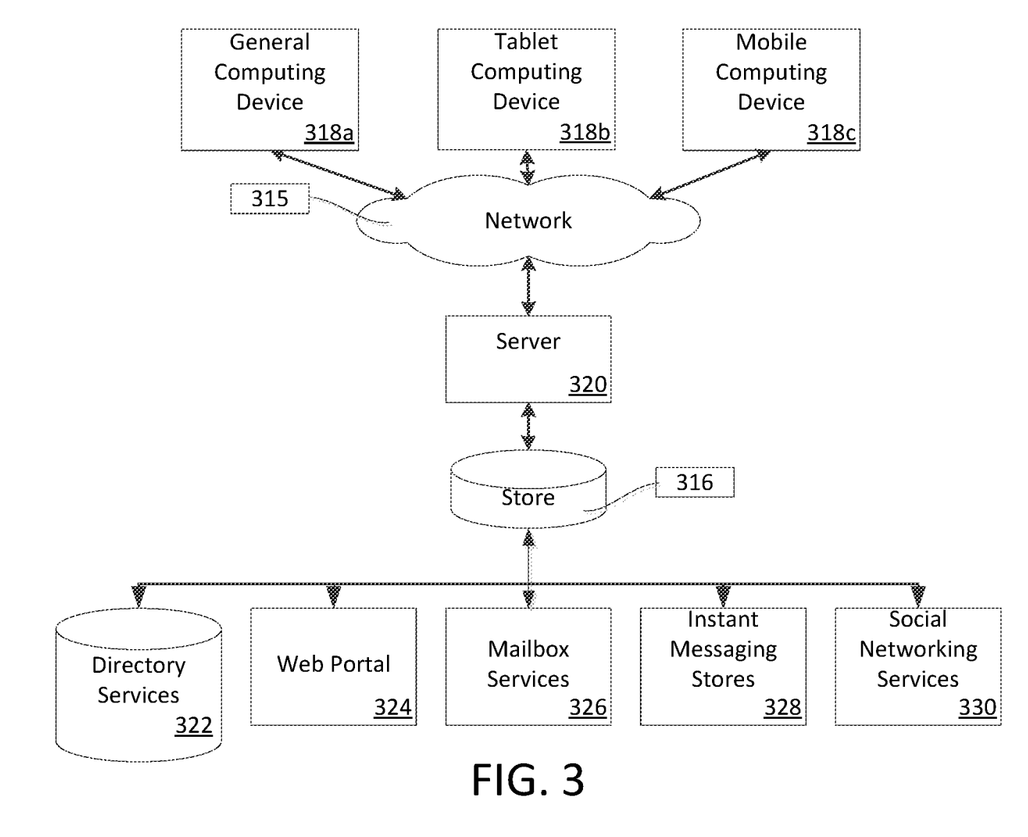
FIG. 3 is a simplified block diagram of a distributed computing system in which aspects of the present disclosure may be practiced.

FIGS. 1-3 and the associated descriptions provide a discussion of a variety of operating environments in which examples of the invention may be practiced. However, the devices and systems illustrated and discussed with respect to FIGS. 1-3 are for purposes of example and illustration and are not limiting of a vast number of computing device configurations that may be utilized for practicing examples of the invention, described herein.

FIG. 1 is a block diagram illustrating physical components of a computing device 102, for example a mobile processing device, with which examples of the present disclosure may be practiced. For example, computing device 102 may be an exemplary computing device for implementation of processing performed related to query classification. In a basic configuration, the computing device 102 may include at least one processing unit 104 and a system memory 106. Depending on the configuration and type of computing device, the system memory 106 may comprise, but is not limited to, volatile storage (e.g., random access memory), non-volatile storage (e.g., read-only memory), flash memory, or any combination of such memories. The system memory 106 may include an operating system 107 and one or more program modules 108 suitable for running software programs/modules 120 such as IO manager 124, other utility 126 and application 128. As examples, system memory 106 may store instructions for execution. Other examples of system memory 106 may store data associated with applications. The operating system 107, for example, may be suitable for controlling the operation of the computing device 102. Furthermore, examples of the invention may be practiced in conjunction with a graphics library, other operating systems, or any other application program and is not limited to any particular application or system. This basic configuration is illustrated in FIG. 1 by those components within a dashed line 122. The computing device 102 may have additional features or functionality. For example, the computing device 102 may also include additional data storage devices (removable and/or non-removable) such as, for example, magnetic disks, optical disks, or tape. Such additional storage is illustrated in FIG. 1 by a removable storage device 109 and a non-removable storage device 110.

As stated above, a number of program modules and data files may be stored in the system memory 106. While executing on the processing unit 104, program modules 108 (e.g., Input/Output (I/O) manager 124, other utility 126 and application 128) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 102 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 102 may also have one or more input device(s) 112 such as a keyboard, a mouse, a pen, a sound input device, a device for voice input/recognition, a touch input device, etc. The output device(s) 114 such as a display, speakers, a printer, etc. may also be included. The aforementioned devices are examples and others may be used. The computing device 104 may include one or more communication connections 116 allowing communications with other computing devices 118. Examples of suitable communication connections 116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 106, the removable storage device 109, and the non-removable storage device 110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 102. Any such computer storage media may be part of the computing device 102. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 2A and 2B illustrate a mobile computing device 200, for example, a mobile telephone, a smart phone, a personal data assistant, a tablet personal computer, a phablet, a slate, a laptop computer, and the like, with which examples of the invention may be practiced. Mobile computing device 200 may be an exemplary computing device for processing related to query classification. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 2A, one example of a mobile computing device 200 for implementing the examples is illustrated. In a basic configuration, the mobile computing device 200 is a handheld computer having both input elements and output elements. The mobile computing device 200 typically includes a display 205 and one or more input buttons 210 that allow the user to enter information into the mobile computing device 200. The display 205 of the mobile computing device 200 may also function as an input device (e.g., a touch screen display). If included, an optional side input element 215 allows further user input. The side input element 215 may be a rotary switch, a button, or any other type of manual input element. In alternative examples, mobile computing device 200 may incorporate more or less input elements. For example, the display 205 may not be a touch screen in some examples. In yet another alternative example, the mobile computing device 200 is a portable phone system, such as a cellular phone. The mobile computing device 200 may also include an optional keypad 235. Optional keypad 235 may be a physical keypad or a "soft" keypad generated on the touch screen display or any other soft input panel (SIP). In various examples, the output elements include the display 205 for showing a GUI, a visual indicator 220 (e.g., a light emitting diode), and/or an audio transducer 225 (e.g., a speaker). In some examples, the mobile computing device 200 incorporates a vibration transducer for providing the user with tactile feedback. In yet another example, the mobile computing device 200 incorporates input and/or output ports, such as an audio input (e.g., a microphone jack), an audio output (e.g., a headphone jack), and a video output (e.g., a HDMI port) for sending signals to or receiving signals from an external device.

FIG. 2B is a block diagram illustrating the architecture of one example of a mobile computing device. That is, the mobile computing device 200 can incorporate a system (i.e., an architecture) 202 to implement some examples. In one examples, the system 202 is implemented as a "smart phone" capable of running one or more applications (e.g., browser, e-mail, calendaring, contact managers, messaging clients, games, and media clients/players). In some examples, the system 202 is integrated as a computing device, such as an integrated personal digital assistant (PDA), tablet and wireless phone.

One or more application programs 266 may be loaded into the memory 262 and run on or in association with the operating system 264. Examples of the application programs include phone dialer programs, e-mail programs, personal information management (PIM) programs, word processing programs, spreadsheet programs, Internet browser programs, messaging programs, and so forth. The system 202 also includes a non-volatile storage area 268 within the memory 262. The non-volatile storage area 268 may be used to store persistent information that should not be lost if the system 202 is powered down. The application programs 266 may use and store information in the non-volatile storage area 268, such as e-mail or other messages used by an e-mail application, and the like. A synchronization application (not shown) also resides on the system 202 and is programmed to interact with a corresponding synchronization application resident on a host computer to keep the information stored in the non-volatile storage area 268 synchronized with corresponding information stored at the host computer. As should be appreciated, other applications may be loaded into the memory 262 and run on the mobile computing device 200 described herein.

The system 202 has a power supply 270, which may be implemented as one or more batteries. The power supply 270 might further include an external power source, such as an AC adapter or a powered docking cradle that supplements or recharges the batteries.

The system 202 may include peripheral device port 230 that performs the function of facilitating connectivity between system 202 and one or more peripheral devices. Transmissions to and from the peripheral device port 230 are conducted under control of the operating system (OS) 264. In other words, communications received by the peripheral device port 230 may be disseminated to the application programs 266 via the operating system 264, and vice versa.

The system 202 may also include a radio interface layer 272 that performs the function of transmitting and receiving radio frequency communications. The radio interface layer 272 facilitates wireless connectivity between the system 202 and the "outside world," via a communications carrier or service provider. Transmissions to and from the radio interface layer 272 are conducted under control of the operating system 264. In other words, communications received by the radio interface layer 272 may be disseminated to the application programs 266 via the operating system 264, and vice versa.

The visual indicator 220 may be used to provide visual notifications, and/or an audio interface 274 may be used for producing audible notifications via the audio transducer 225. In the illustrated example, the visual indicator 220 is a light emitting diode (LED) and the audio transducer 225 is a speaker. These devices may be directly coupled to the power supply 270 so that when activated, they remain on for a duration dictated by the notification mechanism even though the processor 260 and other components might shut down for conserving battery power. The LED may be programmed to remain on indefinitely until the user takes action to indicate the powered-on status of the device. The audio interface 274 is used to provide audible signals to and receive audible signals from the user. For example, in addition to being coupled to the audio transducer 225, the audio interface 274 may also be coupled to a microphone to receive audible input, such as to facilitate a telephone conversation. In accordance with examples of the present invention, the microphone may also serve as an audio sensor to facilitate control of notifications, as will be described below. The system 202 may further include a video interface 276 that enables an operation of an on-board camera 230 to record still images, video stream, and the like.

A mobile computing device 200 implementing the system 202 may have additional features or functionality. For example, the mobile computing device 200 may also include additional data storage devices (removable and/or non-removable) such as, magnetic disks, optical disks, or tape. Such additional storage is illustrated in FIG. 2B by the non-volatile storage area 268.

Data/information generated or captured by the mobile computing device 200 and stored via the system 202 may be stored locally on the mobile computing device 200, as described above, or the data may be stored on any number of storage media that may be accessed by the device via the radio 272 or via a wired connection between the mobile computing device 200 and a separate computing device associated with the mobile computing device 200, for example, a server computer in a distributed computing network, such as the Internet. As should be appreciated such data/information may be accessed via the mobile computing device 200 via the radio 272 or via a distributed computing network. Similarly, such data/information may be readily transferred between computing devices for storage and use according to well-known data/information transfer and storage means, including electronic mail and collaborative data/information sharing systems.

FIG. 3 illustrates one example of the architecture of a system for providing an application that reliably accesses target data on a storage system and handles communication failures to one or more client devices, as described above. The system of FIG. 3 may be an exemplary system for query classification as described herein. Target data accessed, interacted with, or edited in association with programming modules 108, applications 120, and storage/memory may be stored in different communication channels or other storage types. For example, various documents may be stored using a directory service 322, a web portal 324, a mailbox service 326, an instant messaging store 328, or a social networking site 330, application 128, 10 manager 124, other utility 126, and storage systems may use any of these types of systems or the like for enabling data utilization, as described herein. A server 320 may provide storage system for use by a client operating on general computing device 102 and mobile device(s) 200 through network 315. By way of example, network 315 may comprise the Internet or any other type of local or wide area network, and client nodes may be implemented as a computing device 102 embodied in a personal computer, a tablet computing device, and/or by a mobile computing device 200 (e.g., mobile processing device). Any of these examples of the client computing device 102 or 200 may obtain content from the store 316.

Figure 4:
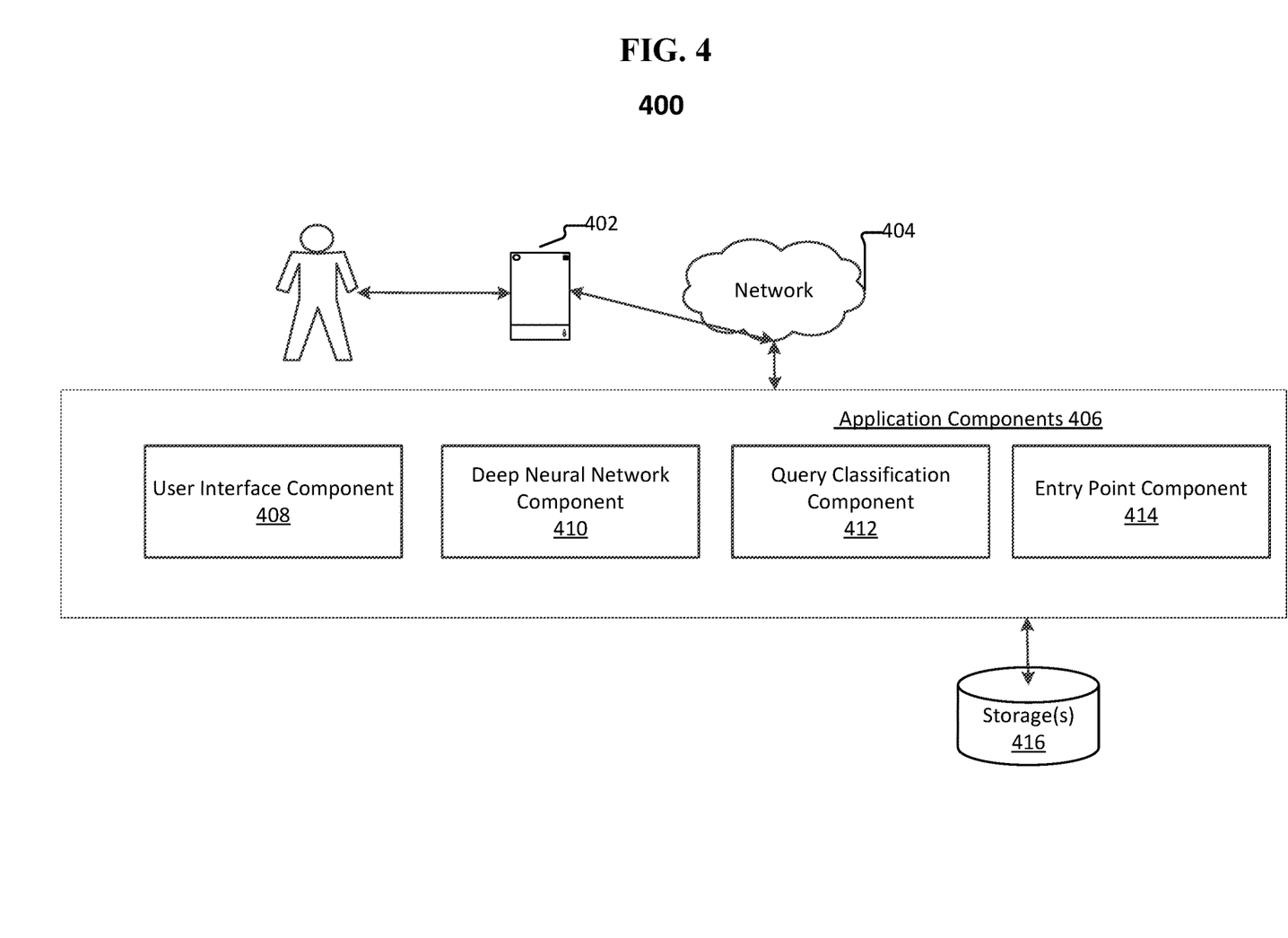
FIG. 4 illustrates an exemplary system implementable on one or more computing devices on which aspects of the present disclosure may be practiced.

FIG. 4 illustrates an exemplary system 400 implementable on one or more computing devices on which aspects of the present disclosure may be practiced. System 400 may be an exemplary system for processing related to query classification as described herein. Exemplary system 400 presented is a combination of interdependent components that interact to form an integrated whole for incorporation and application of a model that may be used evaluate appropriateness of a query. Components of system 400 may be hardware components or software implemented on and/or executed by hardware components. In examples, system 400 may include any of hardware components (e.g., ASIC, other devices used to execute/run an OS, and software components (e.g., applications, application programming interfaces, modules, virtual machines, runtime libraries) running on hardware. In one example, an exemplary system 400 may provide an environment for software components to run, obey constraints set for operating, and makes use of resources or facilities of the systems/processing devices, where components may be software (e.g., application, program, module) running on one or more processing devices. For instance, software (e.g., applications, operational instructions, modules) may be executed on a processing device such as a computer, mobile device (e.g., smartphone/phone, tablet) and/or any other type of electronic devices. As an example of a processing device operating environment, refer to operating environments of FIGS. 1-3. In other examples, the components of systems disclosed herein may be spread across multiple devices. For instance, input may be entered on a client device (e.g., processing device) and information may be processed or accessed from other devices in a network such as one or more server devices.

One of skill in the art will appreciate that the scale of systems such as system 400 may vary and may include more or fewer components than those described in FIG. 4. In some examples, interfacing between components of the system 400 may occur remotely, for example where components of system 400 may be spread across one or more devices of a distributed network. In examples, one or more data stores/storages or other memory are associated with system 400. For example, a component of system 400 may have one or more data storages/memories/stores associated therewith. Data associated with a component of system 400 may be stored thereon as well as processing operations/instructions executed by a component of system 400. Furthermore, it is presented that application components of system 400 may interface with other application services. Application services may be any resource that may extend functionality of one or more components of system 400. Application services may include but are not limited to: web search services, e-mail applications, calendars, device management services, address book services, informational services, etc.), line-of-business (LOB) management services, customer relationship management (CRM) services, debugging services, accounting services, payroll services, and services and/or websites that are hosted or controlled by third parties, among other examples. Application services may further include other websites and/or applications hosted by third parties such as social media websites; photo sharing websites; video and music streaming websites; search engine websites; sports, news or entertainment websites, and the like. Application services may further provide analytics, data compilation and/or storage service, etc., in association with components of system 400.

Further, components of system 400 may possess processing means and may be configured to handle any type of input including but not limited to speech/voice input, text input, gesture input, handwritten input, among other examples. System 400 may be scalable and configurable to operate on a variety of processing devices including but not limited to: desktop computers, laptop computers, mobile processing devices such as phones, tablets, slates, wearable processing devices (e.g., watches, glasses, earpieces etc.), vehicular processing devices, and any other devices having at least one processor, among other examples. Exemplary system 400 comprises application components 406 including a user interface component 408, a deep neural network component 410, a query classification component 412 and an entry point component 414, where each of the identified components may comprise one or more additional components.

System 400 may further comprise one or more storages 416 that may store data associated with operation of one or more components of system 400. In examples, storages 416 may interface with other components of system 400. Data associated with any component of system 400 may be stored in storages 416, where components may be connected to storages 416 over a distributed network including cloud computing platforms and infrastructure services. Exemplary storages 416 may be any of a first-party source, a second-party source, and a third-party source. Storages 416 are any physical or virtual memory space. Storages 416 may store any data for processing operations performed by components of system 400, retained data from processing operations, stored programs, code or application programming interfaces (APIs), training data, links to resources internal and external to system 400 and knowledge data among other examples. Furthermore, in examples, components of system 400 may utilize knowledge data in processing by components of system 400. Knowledge may be used by one or more components of system 400 to improve processing of any of the application components 406 where knowledge data can be obtained from resources internal or external to system 400. In examples, knowledge data may be maintained in storage(s) 416 or retrieved from one or more resources external to system 400 by knowledge fetch operation.

In FIG. 4, processing device 402 may be any device comprising at least one processor and at least one memory/storage. Examples of processing device 402 may include but are not limited to: processing devices such as desktop computers, servers, phones, tablets, phablets, slates, laptops, watches, and any other collection of electrical components such as devices having one or more processors or circuits. In one example processing device 402 may be a device of a user that is executing applications/services. In examples, processing device 402 may communicate with the application components 406 via a network 404. In one aspect, network 404 is a distributed computing network, such as the Internet. Application services may communicate with application components 406 via the network 404. Processing device 402 may be a device as described in the description of FIGS. 1-3. In some examples, processing device 402 may comprise multiple connected devices.

The application components 406 are a collection of components configured for query processing including classification of a query. Application components 406 may comprise: a user interface component 408, a deep neural network component 410, a query classification component 412 and an entry point component 414. In alternative examples, one or more additional components may be created to manage operations described throughout the present disclosure. In different examples, the application components 406 may be used to execute independently from other application components 406. As an example, processing executed by any of the application components 406 may be performed by a processing device or incorporated into a product separately from processing performed by other components such as the user interface component 408 or the entry point component 414, among other examples. Application components 406 may be stored on one or more processing devices (e.g., client device) or access to one or more of the application components 406 may be distributed, for example through a distributed network.

The user interface component 408 is one or more components that are configured to enable interaction with a user of a processing device. Transparency and organization are brought to users of a processing device through the user interface component 408 where an application/service can interact with a user processing device through the user interface component 408. As an example, the user interface component 408 may comprise generation and display of one or more user interface elements that may be displayed upon a processing device during execution of one or more applications. The user interface elements may be graphical icons used to represent information associated with an application. The user interface component 408 may further execute as a front-end for display (e.g., graphical user interface) of back-end processing performed by the other application components 406. In examples, user interface definition files may be used to define user interface elements for fostering interaction between a processing device and applications/services that may be associated with query processing. User interface definition files may comprise programming instructions or operations for management and display of user interface elements associated with user interface component 408. As an example, user interface elements may be used to illustrate operations including but not limited to: application management, receiving and processing of input, query entry and signal processing, providing responses, auto-complete suggestions, etc. Input may be received in any form including but not limited to: text input, voice input, handwritten input, user interface item selection, etc. A received query may be propagated to the deep neural network component 410 to evaluate the query.

The deep neural network component 410 is a DNN component adapted to provide learning representations of query data to identify patterns of appropriateness of the query. In examples, the deep neural network component 410 models high-level abstractions of query data using multiple processing layers and complex structures. The deep neural network component 410 may comprise a corpus of query data that may be trained and updated to provide an evolving representation of different levels of appropriateness that can be used to identify patterns in query data. One example of an adapted DNN model used by the deep neural network component 410 is a DSSM. An exemplary DSSM is a DNN modeling technique for representing lexical features of text strings (sentences, queries, predicates, entity mentions, etc., in a continuous semantic space and modeling semantic similarity between text strings to identify patterns. The DSSM is used to develop latent semantic models that project entities of different types (e.g., queries and documents) into a common low-dimensional semantic space for a variety of machine learning tasks such as ranking and classification. For instance, lexical features can be evaluated and labeled and evaluated by an adapted DNN model to evaluate appropriateness of the query. The deep neural network component 410 is configured to adapt a DSSM model to incorporate offensiveness categories by injecting an objective function which clusters queries from same inappropriate categories. Application of a DNN model such as a DSSM creates an abstract offensive space where queries can be clustered according to various categories of appropriateness/offensiveness. The abstract space is built using processing operations for supervised latent projection. That is, processing operations executed incorporate labeled query data into projection learning. In examples, an exemplary configured DNN that is trained for query classification performs processing operations that convert a query from the tri-gram vector space (e.g. a bit vector of length ~10.000) to a condensed representation (e.g. a vector of 128 real numbers). The trained DNN learns this mapping from the labelled training data. The mapping embeds the semantic similarity of two queries (i.e. queries whose vectors are closer are more likely to represent the same intent), which can be utilized to classify a received query in a category of appropriateness.

Figure 5:
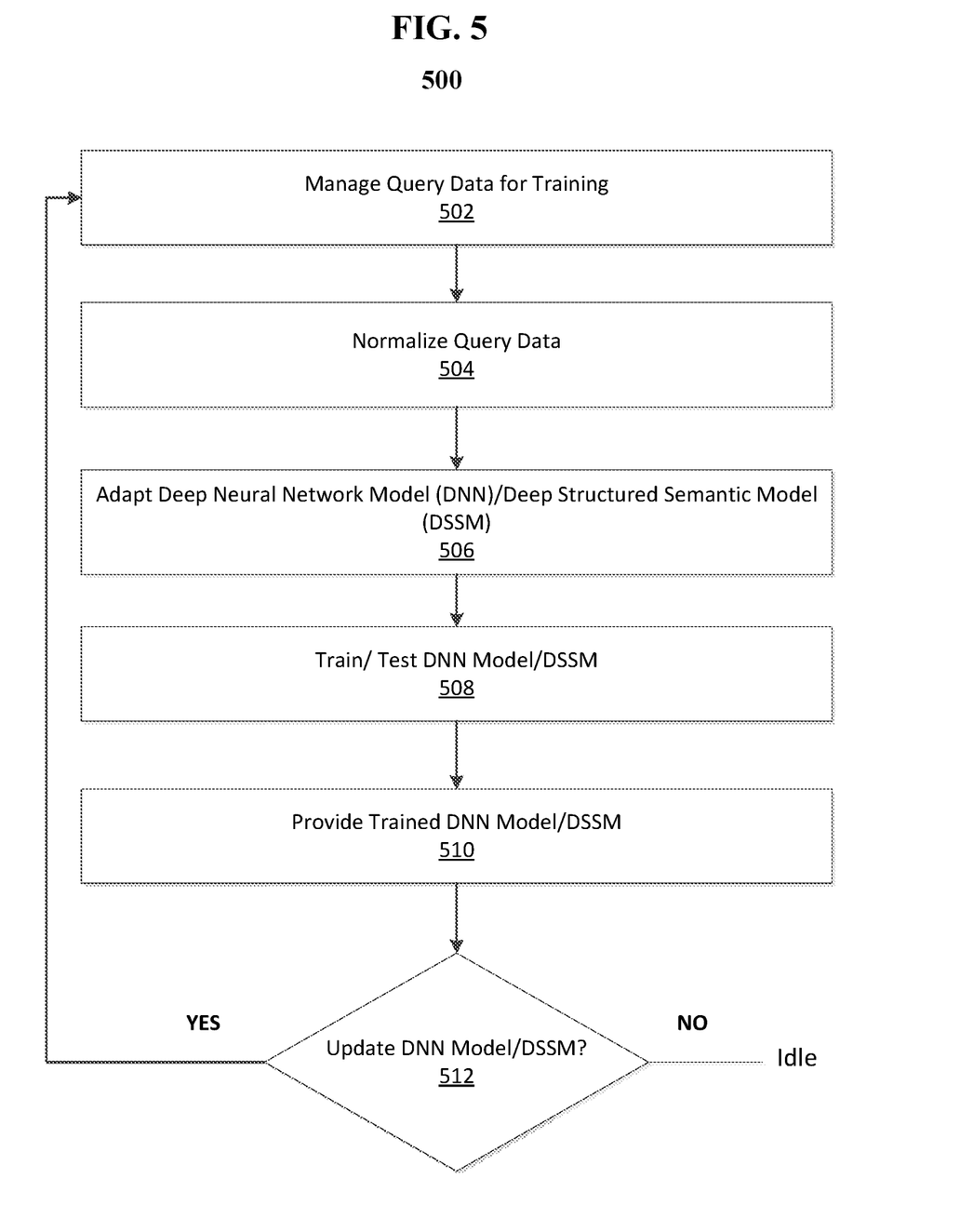
FIG. 5 is an exemplary method for adapting of a deep neural network model for query classification with which aspects of the present disclosure may be practiced.
Figure 6:
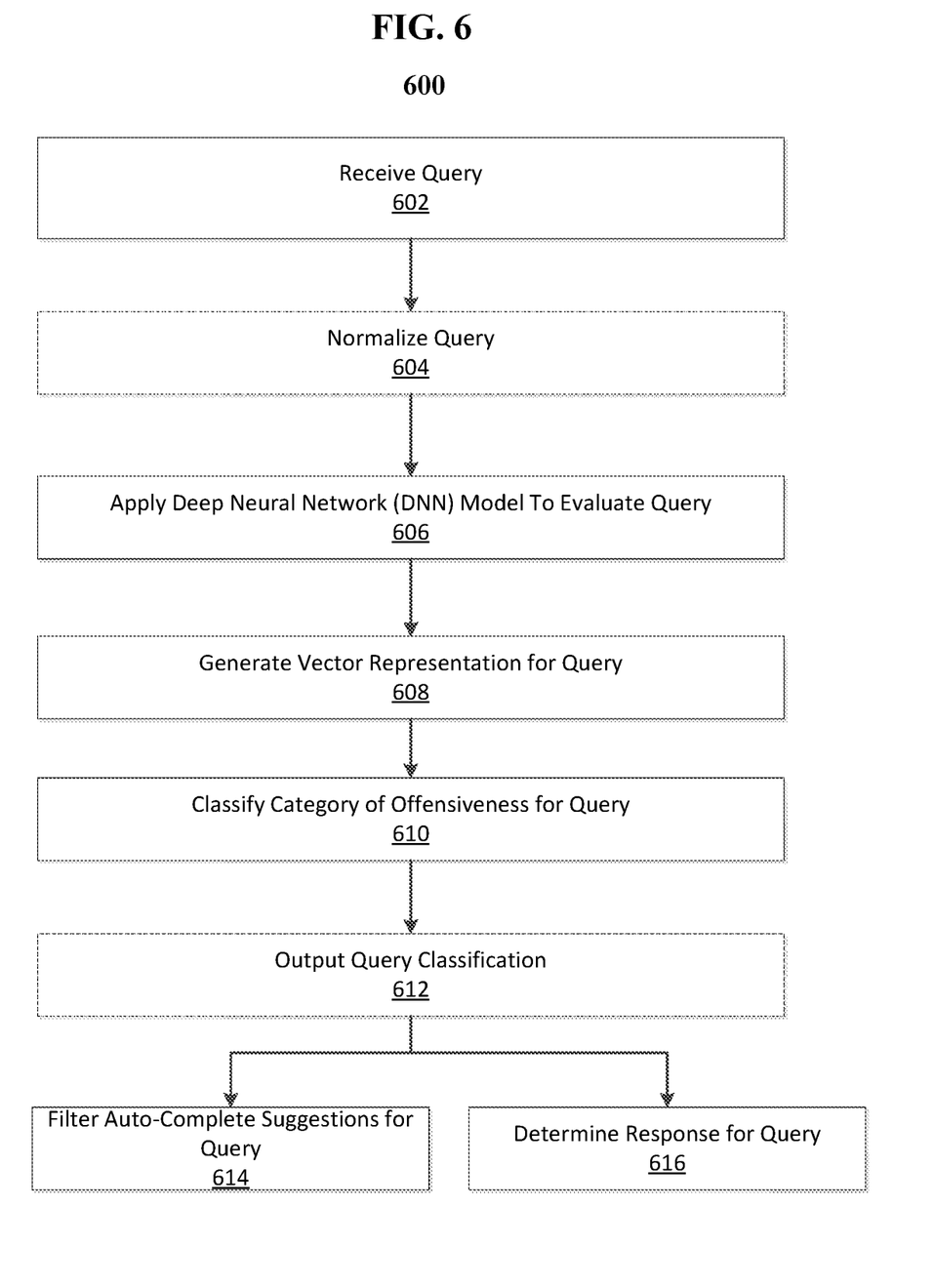
FIG. 6 is an exemplary method for classifying a query using a deep neural network model which aspects of the present disclosure may be practiced.

Examples of processing operations performed by the deep neural network component 410 with respect to generation and training of an adapted DNN model are described in the description of method 500 (FIG. 5). Moreover, additional examples of processing operations that may be executed by the deep neural network component 410 (as related to query evaluation) are described in the description of method 600 (FIG. 6). Further, as identified above, a DNN model may be extensible to evaluate signal data (e.g., processing device signal data, user account signal data, prosodic features of an utterance, etc.) in addition to lexical features of a query. The deep neural network component 410 may interface with other application components 406 such as the user interface component 408 for receipt and process of data associated with a query. Additionally, the deep neural network component 410 may interface with the query classification component 412 to evaluate a query and classify the query according to a category of appropriateness.

The query classification component 412 is a component configured for evaluation to classify appropriateness of a query. In examples, the query classification component 412 utilizes a DNN model, generated and provided by the deep neural network component 410, to process a query. Examples of processing operations executed by the query classification component 412 related to evaluation and classification of offensiveness of a query are described in the description of method 600 (FIG. 6). The query classification component 412 may interface with other application components 406 such as the deep neural network component 410 and the entry point management component 414 to provide classification of a query. In one example, the query classification component 412 provides query classification data to the deep neural network component 410 for adaption of a DNN model. In examples, query data and classification data may be used to train and update a DNN model. In some examples, classification of a query may be provided to the entry point management component 414 to assist with subsequent processing of a query. For instance, a classification of offensiveness may be provided to an entry point to assist the entry point in generating a response to the query.

The entry point component 414 is a component configured to manage one or more entry points that may be used to process a query. As identified above, an entry point is a point of entry or platform for communication with an application or service for unified ranking processing. In examples, an entry point may include but is not limited to: any applications/services including search applications, intelligent personal assistant applications, first-party products/services, second-party products/services, and third-party products/services, among other examples. For instance, a classification of appropriateness may be signal data provided to a web ranking service that evaluates and returns content results for the query. A classification of appropriateness may improve processing efficiency during subsequent stages of query processing. In one instance, richer result content may be provided based on an initial classification indicating appropriateness of the query. In one example, an entry point may be an application/service that is separate from a processing device or devices that executes query classification. In another example, a product or service may incorporate the query classification component 412 and the entry point component 414, among other application components 406, within a single entry point. In one instance, the query classification component 412 may be a component of an entry point such as a query processing application/service (e.g. search service, digital media delivery service, user interface platform, etc.).

FIG. 5 is an exemplary method 500 for adapting of a deep neural network model for query classification with which aspects of the present disclosure may be practiced. As an example, method 500 may be executed by an exemplary processing device and/or system such as those shown in FIGS. 1-4. In examples, method 500 may execute on a device comprising at least one processor configured to store and execute operations, programs or instructions. Operations performed in method 500 may correspond to operations executed by a system and/or service that execute computer programs, application programming interfaces (APIs), or machine-learning processing, among other examples. Adaptation of a DNN model including generation, training and testing of the DNN model may occur across a plurality of processing devices.

Method 500 begins at operation 502, where query data is managed for training of a DNN model. In examples, operation 502 may comprise compiling a corpus of queries to evaluate for testing and training of a DNN model. Processing operations are applied to compile a corpus of query data. In one example, queries may be extracted from a search application/service for further evaluation. For instance, thousands and thousands of queries may be extracted and aggregated to generate the corpus of query data.

Management (operation 502) of query data may further comprise curating the corpus of query data. In one example, curation of the query data comprises evaluating queries for appropriateness through a crowd-sourcing platform. Queries may be labeled, through the crowd-sourcing platform as being appropriate or inappropriate. One skilled in the art, understanding the present disclosure, should understand that labeling of queries according to a category of offensiveness may vary depending on how specifically developers want to evaluate levels of appropriateness. In one example, a number of categories of appropriateness may be established and used to evaluate the corpus of query data. An example of categorical classification of appropriateness for evaluating query data may be similar to the following:

Category 1($c_0$): Okay/Appropriate
Category 2($c_1$): Violence/Illegal/Self-Harm
Category 3($c_2$): Race/Religion/Sexual/Gender
Category 4($c_3$): Other offensive/profane.

Flow may proceed to operation 504, where the query data is normalized. Normalization (operation 504) of query data may comprise converting characters (e.g., converting characters to different cases), removing punctuation, correcting spelling errors, etc. Normalization (operation 504) of query data for the corpus of query data helps to provide a limited character set (e.g. a-z, 0-9, !-+, etc.) to evaluate query data of a query. In some instances, normalization (operation 504) of query data may occur at various points in generation of a DNN model to classify appropriateness of query data. For instance, normalization (operation 504) of query data may be executed before query data is labeled.

Flow may proceed to operation 506, where a DNN model is adapted to classify query data for appropriateness. As an example, the DNN model is a DSSM. Operation 506 may comprise determining a bit vectors for query data of the corpus of query data. As an example, a bit vector may be a value that represents lexical features associated with a query.

The bit vectors may be representations of n-grams (e.g., tri-grams) identified within a query. In one example, processing operations may be executed to convert a normalized query into tri-gram bit representations. As an example, consider a potentially inappropriate query of "how to commit suicide." In that example, processing operation 506 may evaluate different tri-gram representations for such a query (e.g. 'how to commit suicide'→'$ho' 'how', 'ow', 'w t', 'to', 'com', 'omi', 'mmi', 'mit', 'it' . . . 'de^'). Each tri-gram has a unique index (0 . . . 60000), with respect to all the possible tri-grams in the English language, (approximately to the scale of 40^3). In one example, exemplary bit vectors may be extremely sparse as tri-grams considered may be part of a corpus of training data (and not the entirety of possible tri-grams). While tri-grams are evaluated in one example, one skilled in the art, understanding the present disclosure, should recognize that feature evaluation may vary to evaluate lexical features in any way and examples may even be extended to evaluate other types of feature data associated with a query.

Flow may proceed to operation 508, where a DNN model/DSSM is trained and/or tested. In some examples, adaption of a DNN model (e.g. training and testing) may comprise processing operations for training and testing the entire corpus of query data. In other examples, the corpus of query data may be separated into data for training of a DNN model and data for testing of a DNN model.

Training of a DNN model (e.g. DSSM) may comprise processing operations that process the bit vectors representing lexical features using the DNN model (e.g., DSSM). The training aims to tell the DNN model that a particular pair of queries are of the same inappropriate category and should be close to each other in the latent space projected in DNN mapping. In a similar way, training can also identify that a particular pair of queries are of different inappropriate categories and should be distant from each other in the latent space. As the classification happens in a low-dimensional space, an exemplary DNN model is also very efficient for query classification. There are many parameters in the DNN model which can be tuned and also potentially affect the performance e.g. number of layers, number of hidden units, batch size etc. One skilled in the art should understand that any such parameters can be adjusted to optimize processing using a DNN model. Training and testing may occur to optimize a DNN model for application.

Training the DNN model may take many hours using hundreds of machines. During training, the DNN model is given: 1) Pairs of positive examples (2 examples belonging to the same class, e.g. 2 racy queries, 2) Pairs of negative examples (2 examples belonging to different classes, e.g. 1 violent and one okay query). An objective function is applied to learn a compact vector representation (a 128-double vector), that maximizes the vector distance between opposite classes of appropriateness and minimizes the vector distance between queries in the same class of appropriateness.

For instance, in an example where a DSSM is being adapted to classify queries according to a category of appropriateness, let $c_k \in C$ represent the $k^{th}$ inappropriate category where $|C|>2$ and $c_0$ represents the appropriate (OK) category. Hence, $|C|=2$ represents the binary setting with categories {OK, inappropriate}. Let $x_{q,ck} \in R^n$ be vector representation of query q labeled to belong inappropriate category $c_k$ and n is input dimensionality. A query $x_q$ is projected for training to $y_q = \varphi(x_q)$ by DSSM ($\varphi$) where $y_q \in R^m$, m≪n as shown in the following equation:

$$h_{q,11} = g(W_1 * + b_1)$$

$$y_q g(W_2 * h_q^{(11)} b_2)$$

In accordance with the above equation, $W_1$ and $b_1$ represent $i^{th}$ layer weights and bias parameters of a DSSM network, where $h_q^{(11)}$ represent the hidden layer activities and g is the hyperbolic tangent activation function. Processing operations associated with an objective function may be executed to cluster queries into various categories of offensiveness. The DSSM is trained to maximize the objective function using backpropagation, among other examples. An example of an objective function used for clustering of queries is:

$$J(\theta) = \cos(y_q, y^+_q) - \cos(y_q, y^-_q)$$

In the equation above, $y^+_q$ represents same category query to that of $y_q$ and $y^-_q$ represents a different category query to that of $y_q$. The objective function $J(\theta)$ encourages those configurations $\theta$ which produce higher cosine similarity between queries belonging to the same category and lower cosine similarity between queries that belong to different categories.

Operation 508 may further comprise projecting labeled queries into an abstract space associated with a DNN model (e.g., DSSM). As identified above, training of the DNN model yields a vector representation (e.g., 128 double vector) associated with each classification of offensiveness that may be used to classify queries. Centroid values for each classification of offensiveness may be determined to identify averages for vector representations associated with each category of offensiveness. This may assist in classifying an appropriateness of a query. One skilled in the art, understanding the present disclosure, should recognize that other types of processing operations (other than centroid determinations) may be applied to statistically model different classifications of offensiveness. Centroids for each category of offensiveness may be calculated in accordance with the following:

$$\mu_{c_k} = \frac{1}{m_k} \sum_i y_{q,c_k}^{(i)}$$

In an example where a DSSM is used, application of the DSSM provides a way to performing inappropriate query classification. Clustering operations described herein yield a set of correlated features such as different distance metrics w.r.t. category centroids (e.g. Lp-norm).

An ensemble classified may be generated and trained to be applied to evaluate new queries for appropriateness. An ensemble classifier may weigh these feature inputs and act as a meta-classifier. The ensemble classifier provides a framework to combine low-level lexical features. In one example, bagging with random forests are processing operations utilized for ensemble classifier training. However, one skilled in the art, understanding the present disclosure, should recognize that other statistical processing operations may be applied to train an ensemble classifier.

When a new query is being evaluated for classification of appropriateness, a query $y_q$ is classified according to category $c_k$ of appropriateness for which Euclidean distance $d(\mu_{c_k}, y_q)$ is at a minimum. For instance, a vector representation generated by application of a DSSM may be compared with centroid values for each of the categories of appropriateness used to classify queries, where the closer the vector representation is to a centroid value for a category the more likely the query is to be classified in that category of appropriateness.

Flow may proceed to operation 510, where the trained DNN model/DSSM is provided to evaluate new queries. The adapted DNN model (e.g., DSSM) may be used to classify appropriateness of new queries using the categories of appropriateness.

Flow may proceed to decision operation 512, where it is determined whether the DNN model is to be updated. If not, flow branches NO and processing remains idle until the DNN model is to be further managed. If it is determined that the DNN model is to be updated, flow branches YES and returns to processing operation 502, where query data for training is further managed.

FIG. 6 is an exemplary method 600 for classifying a query using a deep neural network model which aspects of the present disclosure may be practiced. As an example, method 600 may be executed by an exemplary processing device and/or system such as those shown in FIGS. 1-4. In examples, method 600 may execute on a device comprising at least one processor configured to store and execute operations, programs or instructions. Operations performed in method 600 may correspond to operations executed by a system and/or service that execute computer programs, application programming interfaces (APIs), or machine-learning processing, among other examples.

Method 600 begins at operation 602, where a query is received. Examples for receiving a query are described above including the description of FIG. 4, among other examples. As an example, a query may be received through a processing device. In one case, processing of a query may occur using the processing device that received the query. In another example, query data is transmitted to one or more other processing devices to evaluate a query. For example, a query may be received through a processing device, where classification of the query may occur through an application/service connected with the processing device via a distributed network.

Flow may proceed to operation 604, where the query data is normalized. Examples of normalization of query data are described in at least the description of method 500 (FIG. 5). Similar processing operations may be applied to normalize the query data. Normalization of the query data may result in the generation of normalized data (e.g. normalized query data). In examples, normalized data may be used to generate one or more n-gram representations to evaluate lexical features of the query data. Bit vectors for tri-gram representations may be evaluated using a DNN model.

Flow may proceed to operation 606, where a DNN model is applied to evaluate lexical features of the query. In one example, operation 606 may comprise processing data of the query to generate one or more n-gram representations for the query data. For instance, one or more tri-gram representations may be generated for the query data (e.g. normalized data). Operation 606 may execute processing operations that apply the DNN model to evaluate the one or more tri-gram representations that are represented as bit vectors. As an example, a DSSM evaluates bit vectors related to the tri-gram representations of the query data and may generate a vector representation (e.g., double vector, 128 double vector) as identified in processing operation 608. The vector representation is a compact representation of processing performed that evaluates numerous lexical features of a query.

The vector representation (generated in processing operation 608) may be used to classify a category of appropriateness for the query (e.g., is query OK/appropriate, profane, racially offensive, etc.). For example, determining of the category of appropriateness for the query may comprise: computing distance values for the vector representation corresponding with each of a plurality of categories of appropriateness, and selecting the category of appropriateness from the plurality of categories of offensiveness based on a comparison of the distances values. As an example, distance values may be Euclidean distance values for the vector representation relative to a centroid value associated with each of the plurality of categories of appropriateness. Selecting of the category of appropriateness may occur based on a comparison of the Euclidean distance values, where a category is selected based on a centroid value (for a category of offensiveness) that the vector representation is closest to.

In examples where classification processing for the query is separate from an entry point application/service, flow may proceed to operation 612, where the query classification is output (or transmitted to) an entry point application/service. For instance, query classification (along with query data) may be transmitted to an entry point application/service such as a search service/web ranking service to provide results data for the query.

In any example, classification of a query according to a category of appropriateness impacts subsequent processing associated with one or more application/services. In one example, flow may proceed to operation 614, where auto-complete suggestions may be filtered for the query. Operation 614 may comprise filtering auto-complete suggestions for the query based on a determination of the category of appropriateness for the query. In one example, auto-complete suggestions may not be provided for the query if a query is determined to be inappropriate. That is, output of offensive or inappropriate auto-complete suggestions may be restricted based on a determination that the query is classified as being offensive or inappropriate. In alternative examples, classification of the query may alter different suggestions/recommendations of content that may be provided in an autocomplete suggestion. For instance, if a query is "how to commit suicide" an auto-complete suggestion may direct a user towards a suicide helpline.

In examples where results data is provided for a query, classification of appropriateness of the query may be utilized to determine (operation 616) a response for the query. Depending on a classification of a category of appropriateness for a query based on modeling the query using an adapted DNN model, a response may any of: a contextual response based on the data of the query, an indication that the query is offensive, and ignoring the query in a case where the classification identifies the query as offensive, among other examples. Classification of appropriateness for queries may assist an application/service in appropriately managing a conversation with one or more users.

Subsequent queries may be processed in a similar manner to the processing operations described in method 600.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
receiving, at a processing device, a query;
normalizing the query based on a set of characters;
generating a vector representation of the normalized query based on a deep neural network (DNN) model, wherein the DNN model is trained using a plurality of categories of appropriateness of queries, and wherein the plurality of categories of appropriateness of the queries relate to clusters of inappropriateness for a query context;
determining, using the DNN model, a category of appropriateness of the plurality of categories of appropriateness for the query based on the vector representation; and
filtering auto-complete suggestions for the query based on the determined category of appropriateness.

2. The method according to claim 1, wherein the plurality of categories comprise one or more of: appropriate, violent, discriminatory, and profane.

3. The method according to claim 2, wherein the classifying of the category of appropriateness for the query further comprises: computing distance values for the vector representation corresponding with each of the plurality of categories of appropriateness, and selecting the category of appropriateness from the plurality of categories of appropriateness based on a comparison of the distances values.

4. The method according to claim 1, wherein the filtering further comprises restricting output of an auto-complete suggestion based on the determination indicating that the query is classified as offensive.

5. A method comprising:
receiving, at a processing device, a query;
normalizing the query based on a set of characters;
generating, based on the query, one or more tri-gram representations of the query;
generating, based on a deep neural network (DNN) model, a vector representation of the one or more tri-gram representations of the query, wherein the DNN model is trained using a plurality of categories of appropriateness of queries, and wherein the plurality of categories of appropriateness of the queries relate to clusters of inappropriateness for a query context; and
determining, using the DNN model, a category of appropriateness of the plurality of categories of appropriateness for the query based on the vector representation.

6. The method according to claim 5, further comprising determining a response to the query based on a classification of the category of appropriateness.

7. The method according to claim 6, wherein the response is at least one selected from a group, the group including: a contextual response based on the query, an indication that the query is offensive, and ignoring the query in a case where the classification identifies the query as offensive.

8. The method according to claim 5, further comprising filtering auto-complete suggestions for the query based on a classification of the category of appropriateness.

9. The method according to claim 5, wherein the plurality of categories comprise one or more of appropriate, violent, discriminatory, and profane.

10. The method according to claim 5, further comprising normalizing the data of the query to generate normalized data, wherein the normalized data is processed to generate the one or more tri-gram representations.

11. The method according to claim 5, wherein the determining of the category of appropriateness for the query further comprises: computing distance values for the vector representation corresponding with each of the plurality of categories of appropriateness, and selecting the category of appropriateness from the plurality of categories of appropriateness based on a comparison of the distances values.

12. The method according to claim 11, wherein the computing of the distance of the vector representation to the plurality of categories of appropriateness further comprises: computing Euclidean distance values for the vector representation relative to a centroid value associated with each of the plurality of categories of appropriateness, and wherein the selecting selects the category of appropriateness based on a comparison of the Euclidean distance values.

13. A system comprising:
at least one processor; and
a memory operatively connected with the at least one processor storing computer-executable instructions that, when executed by the at least one processor, causes the at least one processor to execute a method that comprises:
receiving, at a processing device, a query;
normalizing the query based on a set of characters;
generating, based on the query, one or more tri-gram representations of the query;
generating, based on a deep neural network (DNN) model, a vector representation of the one or more tri-gram representations of the query, wherein the DNN model is trained using a plurality of categories of appropriateness of queries, and wherein the plurality of categories of appropriateness of the queries relate to clusters of inappropriateness for a query context; and
determining, using the DNN model, a category of appropriateness of the plurality of categories of appropriateness for the query based on the vector representation.

14. The system according to claim 13, wherein the method further comprises determining a response to the query based on a classification of the category of appropriateness.

15. The system according to claim 14, wherein the response is at least one selected from a group consisting of: a contextual response based on the data of the query, an indication that the query is offensive, and ignoring the query in a case where classification identifies the query as offensive.

16. The system according to claim 13, wherein the method further comprises filtering auto-complete suggestions for the query based on a classification of the category of appropriateness.

17. The system according to claim 13, wherein the plurality of categories comprise one or more of: appropriate, violent, discriminatory, and profane.

18. The system according to claim 13, wherein the method further comprises normalizing data of the query to generate normalized data, wherein the normalized data is processed to generate the one or more tri-gram representations.

19. The system according to claim 13, wherein the determining of the category of appropriateness for the query further comprises: computing distance values for the vector representation corresponding with each of the plurality of categories of appropriateness, and selecting the category of appropriateness from the plurality of categories of appropriateness based on a comparison of the distances values.

20. The system according to claim 19, wherein the computing of the distance of the vector representation to the plurality of categories of appropriateness further comprises: computing Euclidean distance values for the vector representation relative to a centroid value associated with each of the plurality of categories of appropriateness, and wherein the selecting selects the category of appropriateness based on a comparison of the Euclidean distance values.

* * * * *